(12) United States Patent
Chiu et al.

(10) Patent No.: US 8,243,670 B2
(45) Date of Patent: Aug. 14, 2012

(54) USER GROUPING METHOD FOR INTER-CELL INTERFERENCE COORDINATION IN MOBILE TELECOMMUNICATION

(75) Inventors: Che-Sheng Chiu, Taoyuan County (TW); Chih-Hsuan Tang, Taoyuan County (TW)

(73) Assignee: Chunghwa Telecom Co., Ltd., Taoyuan County (TW)

( * ) Notice: Subject to any disclaimer, the term of this patent is extended or adjusted under 35 U.S.C. 154(b) by 407 days.

(21) Appl. No.: 12/544,114

(22) Filed: Aug. 19, 2009

(65) Prior Publication Data

US 2011/0045831 A1 Feb. 24, 2011

(51) Int. Cl.
*H04Q 7/00* (2006.01)
*H04B 7/208* (2006.01)
(52) U.S. Cl. ......... 370/329; 370/332; 370/344; 370/480
(58) Field of Classification Search ........................ None
See application file for complete search history.

(56) References Cited

U.S. PATENT DOCUMENTS

| | | | |
|---|---|---|---|
| 2006/0160539 A1* | 7/2006 | Juan et al. ................... 455/436 |
| 2008/0146231 A1* | 6/2008 | Huang et al. ................. 455/436 |
| 2009/0201867 A1* | 8/2009 | Teo et al. ..................... 370/329 |
| 2010/0041408 A1* | 2/2010 | Caire et al. .................. 455/446 |
| 2010/0177721 A1* | 7/2010 | Simonsson et al. .......... 370/329 |
| 2010/0267338 A1* | 10/2010 | Chiu et al. ................... 455/63.1 |
| 2010/0273492 A1* | 10/2010 | Liu et al. ..................... 455/446 |
| 2011/0003598 A1* | 1/2011 | Ma et al. .................. 455/452.1 |
| 2011/0263282 A1* | 10/2011 | Rune et al. .................. 455/507 |
| 2011/0300873 A1* | 12/2011 | Wen et al. ................... 455/450 |

* cited by examiner

*Primary Examiner* — Yemane Mesfin
*Assistant Examiner* — Christine Duong
(74) *Attorney, Agent, or Firm* — Schmeiser, Olsen & Watts LLP

(57) ABSTRACT

A user grouping method for inter-cell interference coordination technology in mobile telecommunication systems using the handover information and measured data that were defined in existing mobile telecommunication systems to group cell users into cell center users and cell edge users. This method includes: (1) user equipment measuring the average signal strength of the serving cell and neighboring cells; (2) user equipment determining if it should reply with the average signal strength information it measures and if it should initiate the inter-cell interference coordination measuring and response system; (3) serving cell then groups the user equipment as cell center user or cell edge user according to the average signal strength information reported by the user equipment; (4) serving cell allocates a frequency subchannel from cell center subband or cell edge subband according to the grouping result.

17 Claims, 3 Drawing Sheets

USER GROUPING METHOD FOR INTER-CELL INTERFERENCE COORDINATION IN MOBILE TELECOMMUNICATION

BACKGROUND OF THE INVENTION

1. Field of the Invention

This invention relates to a user grouping method using inter-cell interference coordination (ICIC) in mobile telecommunication using the pre-defined scales for information handover and measuring data established in a mobile telecommunication system. This method groups the cell users into center cell users and edge cell users to help employ inter-cell interference coordination (ICIC) and is a simple while efficient user grouping method.

2. Descriptions of the Related Art

The Orthogonal Frequency Division Multiple Access (OFDMA) technology is the important technology to execute the 4th generation (4G) mobile communication technology. IMT-Advanced/4G technologies developed by the primary standards organizations, such as IEEE 802.16m, 3GPP LTE-Advanced, and 3GPP2 UMB+, are all air interface technologies based on the OFDMA technology.

In the OFDMA system, the time-frequency two-dimensional electric waves are composed of an Orthogonal Frequency Division Multiplex (OFDM) symbol in the time domain and a frequency subchannel in the frequency domain. Each frequency subchannel is composed of a plurality of different subcarriers. In a OFDM symbol time interval, each user in the cell use an orthogonal frequency subchannel, therefore, the OFDMA system is free from intra-cell interference, which is an important characteristic of the OFDMA system. When different cells or users use the same frequency subchannel for transmitting messages in the same time interval, an inter-cell co-channel interference (also called inter-cell interference) occurs. Thus, the link quality of the cell edge user degrades and the data throughput decreases, which are serious problems in an OFDMA system.

According to the IMT-Advanced/4G technical requirements issued by the International Telecommunication Union (ITU), the cell edge data rate has become an important performance index. In the future, the 4G mobile communication systems, such as the IEEE 802.16m, 3GPP LTE-Advanced, and 3GPP2 UMB+, all utilize inter-cell interference coordination technology to solve the problem of inter-cell interference. The inter-cell interference coordination technology is configured to coordinate the frequency, time, and/or emitting power between the neighboring cells in advance, in order to avoid or decrease inter-cell interference. Presently, various methods are used to implement inter-cell interference coordination. The most widely used methods are fractional frequency reuse and soft frequency reuse. Pre-4G technologies, such as 3GPP2 UMB and Mobile WiMAX (IEEE 802.16e), apply FFR technology against the problem of inter-cell interference. However, 3GPP LTE is developed to utilize soft frequency reuse technology to address the issue of interference.

FFR technology is a kind of frequency-domain interference coordination technology, which applies a frequency reuse factor (FRF) greater than 1 for planning the frequency in the cell edge region to reduce inter-cell interference. Thus the link quality is considered to be improved and the data throughput is considered to be increased. On the other hand, FFR technology applies an FRF equal to 1 (reuse-1 or FRF=1) in the cell center region to maintain superior system capacity.

FIG. 1 shows frequency resources allocation diagram for realizing partial frequency reuse in a mobile communication system. In the diagram, all useful frequencies are divided into center subband F1 12 and edge subband F3 11, wherein the edge subband F3 11 are further divided into three orthogonal subbands F3A, F3B, and F3C. Therefore, four orthogonal subbands are obtained. Referring to FIG. 1 the center subband F1 12 is adapted for the FRR equal to 1 (reuse-1) reuse method, which means all cells can use the subband. The edge subband F3 11 is adapted for the FRF equal to 3 (reuse-3 or FRF=3) reuse method, and the three subbands F3A, F3B, and F3C are adapted for the cell A13, cell B14 and cell C15 of the base station 1 respectively. Taking cell A 13 as an example, the center subband F1 12 of the cell A 13 is allocated to the neighbor users around the center of the cell, and the spectral efficiency of the subband is the highest. On the other hand, the edge subband F3A of the cell A 13 is first allocated to the cell edge user. At this moment, the reuse-3 reuse method is applied, and the link quality of the edge user is improved.

Soft frequency reuse is a broadcasting power interference coordination technology. The main concept is to broadcast more power to the cell edge area and less power to the center cell area. Since every cell can use the entire subband, soft frequency reuse is a technology of reuse-1 or FRF=1.

FIG. 2 shows the broadcasting power allocation for a base station using current mobile telecommunication soft frequency reuse technology. All available subbands are divided into center subband 22 and edge subband 21; and the edge subbands of cell A 23 and cell B 24 are orthogonal to the edge subband 21 of cell C 25. Pedge and Pcenter represent cell edge subband power and cell center subband power, where the ratio of $P_{edge}/P_{center}$ is greater than 1.

Take cell A 23 for example, its center subbands (F2+F3) will be allocated for center users. Since the user is close to base station 1, there is less interference and less broadcasting power so as to provide sufficient signal quality while its edge subband (F1) will give priority to cell edge users. Because the broadcasting power of the edge subband of sector A 23 is stronger than the center subband broadcasting power of neighboring cells (Cell B 24 and Cell C 25), this can enhance the signal and reduce the interference and improve the connection.

So as to know, whether an OFDMA system uses partial frequency reuse or soft frequency reuse, cell users must be grouped into either center users or edge users. The traditional grouping method used in inter-cell interference coordination uses the user's geometry factor (GF). Geometry factor is defined as wideband average signal to interference plus noise ratio (SINR) as in Equation 1 below where P means broadcasting power, L means path loss, S means shadow fading, A means antenna gain, N means noise power. Sub-notation s and i represent server cell (SC) and interfering cell respectively. φ means the union of interfering cells.

$$GF = \frac{P_s \cdot L_s \cdot S_s \cdot A_s}{\sum_{i \in \varphi} P_i \cdot L_i \cdot S_i \cdot A_i + N} \qquad \text{Equation 1}$$

The acknowledged concept of user grouping in inter-cell interference coordination is:

1. First the user equipment (UE) measures the wideband average SINR of the serving cell or the serving sector and responds to the serving cell.

2. Then the serving cell determines the UE as either a cell center user or cell edge user. If the wideband average SINR is greater than the threshold level, then this UE is a cell center user; if it is smaller than it is a cell edge user.
3. When an UE gains top priority in the scheduler, the system will allocate a frequency subchannel from the center subband of the serving cell if it is a cell center user; and frequency subchannel from the edge subband of the serving cell if it is a cell edge user.

Because using wideband average SINR to group users requires setting the wideband average SINR threshold level in advance and this threshold level depends on the geometry conditions such as inter-site distance. If the threshold level is not set in advance it will affect the ratio of cell center users to cell edge users and result in unpredictable system efficiency and complicate system usage. Besides, using wideband average SINR to group users will cause users with weak signals (i.e. wideband average SINR far below threshold level) to be prevented from being handed over to use cell edge subband. The system capacity will therefore be reduced if this kind of user increases and occupies the cell edge subband.

SUMMARY OF THE INVENTION

The objective of this invention is to provide a user grouping method for use in mobile telecommunication using inter-cell interference coordination technology. This method avoids the uncertainty and system complexity that come with pre-setting the geometry-dependent threshold level, has the advantage of dividing users into cell center users and cell edge users without increasing the wideband average SINR and pre-setting the wideband average SINR threshold level, and achieves improved system efficiency. This method is especially suitable for inter-cell interference coordination technology in OFDMA mobile telecommunication systems.

The user grouping method used in inter-cell interference coordination technology that achieves the purposes described above, uses the measuring data provided by the handover mechanism within the system to identify and group the OFDMA mobile telecommunication users into cell center users and cell edge users. The method is that the UE determines if it should respond the average strength of the serving cell and neighboring cells to serving cell and if it should initiate inter-cell interference coordination measuring and response system according to whether the difference ($\overline{G}_0 - \overline{G}_1$) between the average strength of the serving cell ($\overline{G}_0$) and the maximum average strength from an neighboring cell ($\overline{G}_1$) is less than a positive threshold level ($\delta_{TH}^{UE}$). Then the serving cell determines if an user is a cell edge user according to the response average signal strength from the UE (i.e. the average strength of the serving cell and the strongest average strength of an neighboring cell, or the difference between these two), and if the difference between the average strength of serving cell and the strongest average strength from an neighboring cell is less than a positive threshold level ($\delta_{TH}^{SC}$) as mentioned above. This threshold level must be less than or equal to the previous threshold (i.e. $\delta_{TH}^{SC} \leq \delta_{TH}^{UE}$). Finally, the serving cell allocates a frequency subchannel from either the center subband or edge subband for the user according to the user grouping method.

These features and advantages of the present invention will be fully understood and appreciated from the following detailed description of the accompanying Drawings.

DESCRIPTION OF THE PREFERRED EMBODIMENT

Figure 1:
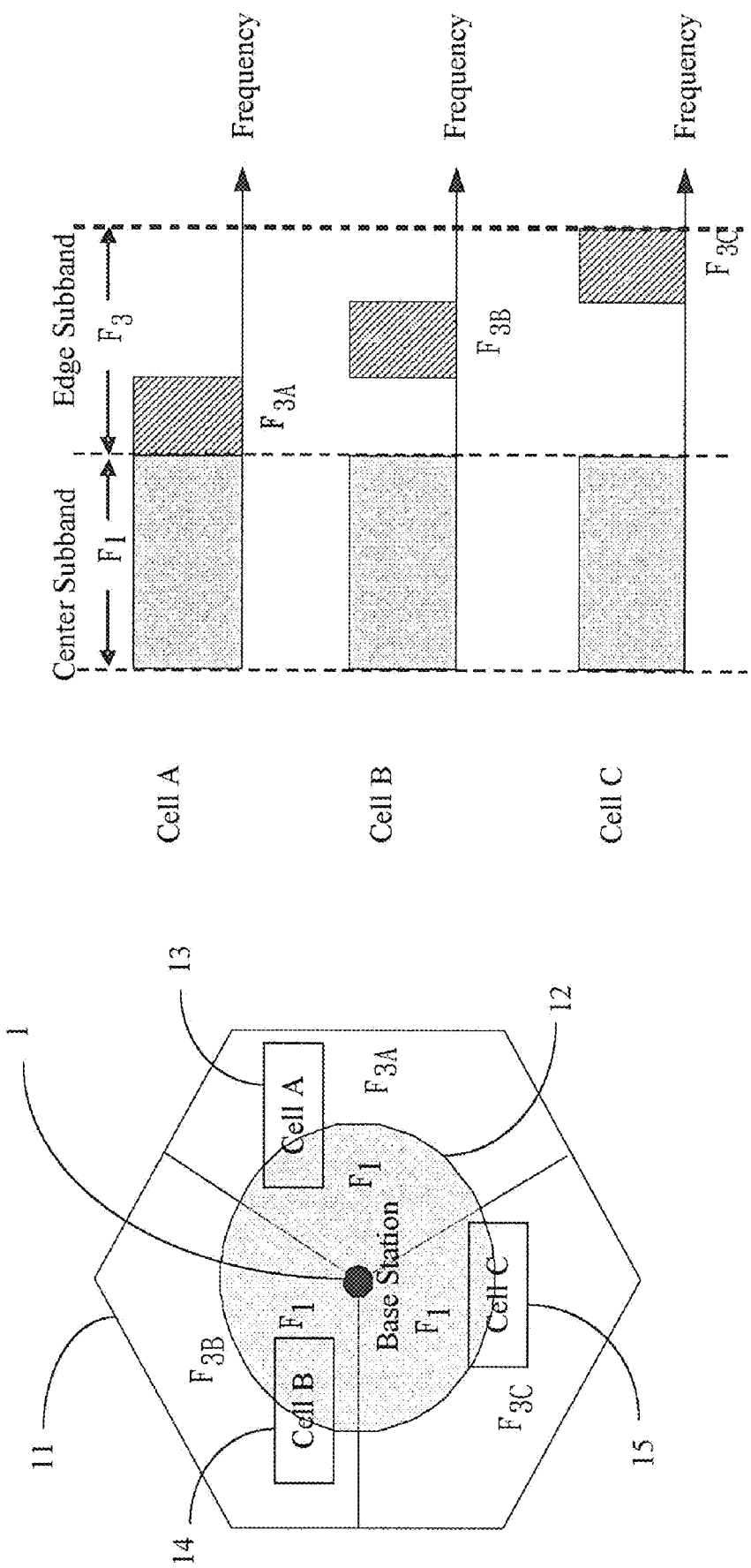
FIG. 1 shows the frequency resource allocation of partial frequency reuse technology used in current mobile telecommunication base station networks.
Figure 2:
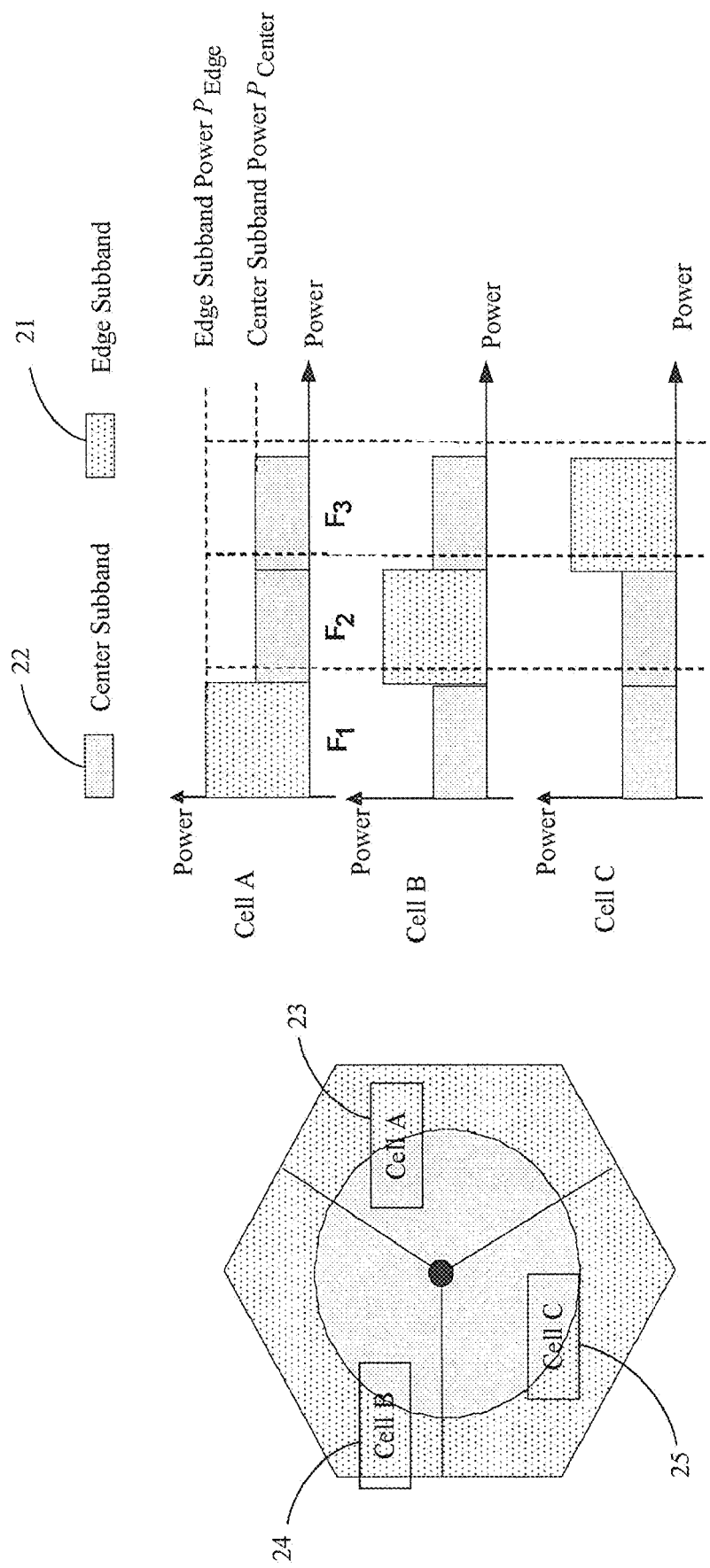
FIG. 2 shows the well known broadcasting power allocation of soft frequency reuse technology used in current mobile telecommunication base station networks.
Figure 3:
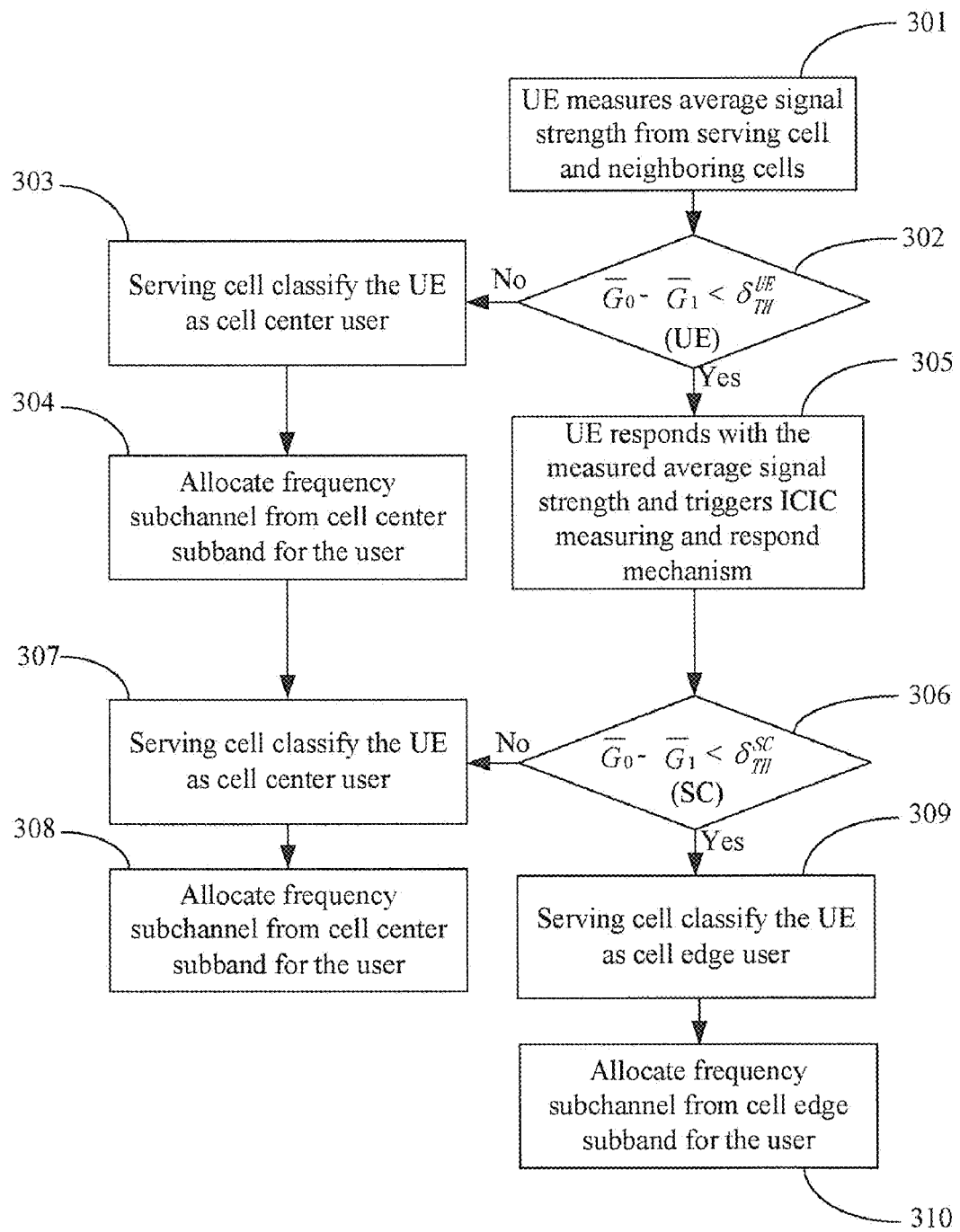
FIG. 3 shows the flow chart of user grouping method in inter-cell interference coordination technology of this invention.

As shown in FIG. 3 is the flow chart of this invention for a method of user grouping in inter-cell interference coordination technology for mobile telecommunication systems. This grouping method can be widely used for inter-cell interference coordination technology using the partial frequency reuse method and soft frequency reuse method.

Step 1: First the user equipment (UE) measures the average signal strength from the serving cell and neighboring cells. This average signal strength is measured by path gain ($\overline{G}$) obtained by measuring the reference signal received power (RSRP) as illustrated in Equation 2. Where P means broadcasting power, L means path loss, S means shadow fading, A means antenna gain, and sub-notation j means the code of cell. In Pre-4G OFDMA mobile telecommunication systems, the UE measuring of the average signal strength of serving cell and neighboring cells was originally part of the handover mechanism, and the neighboring cell set for an UE to measure is notified by broadcasting to the UE in advance so it is very easy to use in the current mobile telecommunication system.

$$\overline{G}_j = P_j \cdot L_j \cdot S_j \cdot A_j \qquad \text{Equation 2:}$$

Step 2: Next the UE determines if it should respond to the average signal strength measured and if it should trigger the ICIC response mechanism. If the UE measures the average signal strength in the strong to weak order as $\overline{G}_1 > \overline{G}_2 > \ldots > \overline{G}_n$ where $\overline{G}_i$ means the i-th strongest average signal strength from the neighboring cells that the UE measures, and n means the size of the set (i.e. the number of neighboring cells). The determination method is shown in Equation 3 where $\overline{G}_0$ means the average signal strength of the serving cell that the UE measures, $\overline{G}_1$ means the strongest average signal strength that the UE measures from the neighboring cells, $\delta_{TH}^{UE}$ is a positive threshold level (ex. $\delta_{TH}^{UE}=4$ dB).

$$\overline{G}_0 - \overline{G}_1 < \delta_{TH}^{UE} \text{(in dB)} \qquad \text{Equation 3:}$$

Step 3: If $\overline{G}_0 - \overline{G}_1 \geq \delta_{TH}^{SC}$ is true, UE does not respond with the average signal strength, nor does it trigger the ICIC measuring and response system. The serving cell will therefore identify the user as a cell center user.

Step 4: Allocate frequency subchannel from cell center subband for the user.

Step 5: If $\overline{G}_0 - \overline{G}_1 < \delta_{TH}^{UE}$ (in dB) is true, UE will respond to the serving cell with the measured average signal strength (e.g. which could be $\overline{G}_0$ or $\overline{G}_1$, or the difference between them $\overline{G}_0 - \overline{G}_1$) and initiates the ICIC measuring and response system. Next, the serving cell will determine if the UE is a cell center user or a cell edge user according to the average signal strength sent by the UE and closely monitor its signal quality through the ICIC measuring and response system. This measuring response system is an average signal strength response mechanism that can be periodically or event triggered. An event triggered response mechanism can be achieved by defining multiple threshold levels of the UE, for example, $\delta_{TH1}^{UE} > \delta_{TH2}^{UE} > \ldots > \delta_{THn}^{UE} (>0)$ while the threshold level in Equation 3 should be the maximum (i.e. $\delta_{TH}^{UE} = \delta_{TH1}^{UE}$).

Step 6: The serving cell also identifies the user as a cell center user or cell edge user according to Eq. 3 but the threshold level is $\delta_{TH}^{SC}$.

Step 7: If $\overline{G}_0 - \overline{G}_1 \geq \delta_{TH}^{SC}$ is not true, the serving cell recognize this UE as a cell center user.

Step 8: Allocate frequency subchannel from cell center subband for the user.

Step 9: If $\overline{G}_1 - \overline{G}_1 \geq \delta_{TH}^{SC}$ is true, it is recognized as a cell edge user. Where $\delta_{TH}^{SC}$ is positive and $\delta_{TH}^{SC} \leq \delta_{TH}^{UE}$. When $\delta_{TH}^{SC}$ is equal to $\delta_{TH}^{UE}$, the serving cell does not need to identify if it is a cell center user or a cell edge user. The average signal strength response from the UE is the signal to trigger ICIC and to classify this UE as a cell edge user.

Step 10: Allocate frequency subchannel from cell edge subband for the user.

Threshold level $\delta_{TH}^{UE}$ and $\delta_{TH}^{SC}$ can be obtained from the experienced parameters from soft handover of the current 3G system (e.g. WCDMA, CDMA2000), such as window_add and addition hysteresis. The efficiency of this system is good and there is no need for new definitions for these values.

The operation of this method can be simplified when an OFGMA mobile telecommunication system supports soft handover. The system can classify the UE as cell center user or cell edge user by querying the active set size (ASS) of the UE. If the ASS of this UE is greater than 1 then it is a cell edge user and if the ASS of this UE is equal to 1 then it is a cell center user. Active set size is the cell number of a user's active set. Since the active cell is a member of the active set, the active set size of each user is greater than 1. Besides, current Pre-4G OFDMA mobile telecommunication systems also use Eq. 3 as the trigger for handover mechanism with a negative threshold level. Next, when an UE gains top priority of transmission in the scheduler, the system will allocate a frequency subchannel from the center subband of the serving cell if the UE is a cell center user and a frequency subchannel from edge subband of the serving cell if it is a cell edge user.

In order to group cell users into cell center users and cell edge users, this invention provides a user grouping method based on handover algorithms defined in current mobile telecommunication systems. It is a realistic and elegant approach because the required measurements are in the existing handover mechanism and it does not need to define the wideband average SINR threshold level. In the widely used geometry factor grouping method, the user side must measure the wideband average SINR it receives and the system must have a pre-defined wideband average SINR threshold level. Whether the threshold level has been set properly will affect the overall performance of the system. Besides, when the signal quality is bad and users that cannot handover piled up, the system capacity is decreased. This invention provides a simple and effective method of cell user grouping using an inter-cell interference coordination mechanism for OFDMA mobile telecommunication systems, which groups the users as cell edge users and cell center users, avoids measuring wideband average SINR, defines the related threshold levels, maintains the proper cell center to cell edge user ratio, and provide excellent system efficiency.

The user grouping method for inter-cell interference coordination in mobile telecommunication systems provided in this invention has the following benefits over the commonly used technologies:

1. This invention uses the handover mechanism measurements in the existing system to distinguish cell center users from cell edge users without calculating wideband average SINR or defining a wideband average SINR threshold level, can reduce the calculations necessary in system operation, and is easy to apply in the mobile telecommunication system.

2. This invention provides a proper cell center user to cell edge user ratio which is retained in future 4G deploying environments with base station intervals varying from 500 meters to 1732 meters, reduces the difficulty and complexity in system operation, and maintains excellent system capacity. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A user grouping method for inter-cell interference coordination technology in mobile telecommunication systems that has the following steps:
   a. measuring, by user equipment (UE), an average signal strength of each of a serving cell and neighboring cells;
   b. identifying a neighboring cell of the neighboring cells having an average signal strength greater than the remaining neighboring cells;
   c. evaluating whether a difference between the average signal strength of the serving cell and the neighboring cell having the greatest average signal strength is less than a threshold value to determine if the UE is to reply with the average signal strength information measured by the UE and if the UE is to initiate an inter-cell interference coordination (ICIC) measuring and response system;
   d. grouping the user equipment as cell center user or cell edge user by the serving cell according to the average signal strength information reported by the user equipment; and
   e. allocating a frequency subchannel according to the grouping result by the serving cell.

2. The user grouping method for inter-cell interference coordination technology in mobile telecommunication systems as claimed in claim 1 whose average signal strength is to be obtained by measuring path gain of a signal power received.

3. The user grouping method for inter-cell interference coordination technology in mobile telecommunication systems as claimed in claim 1 whose neighboring cells that the user equipment measures is to be obtained from the neighboring cell set broadcast by the mobile telecommunication system.

4. The user grouping method for inter-cell interference coordination technology in mobile telecommunication systems as claimed in claim 1 whose user equipment is to or is to not initiate the inter-cell interference coordination (ICIC) measuring and response system was determined by the difference between the average signal strength it measures from the serving cell ($\overline{G}_0$) and the average signal strength it measures from the strongest neighboring cell ($\overline{G}_1$) and a threshold level ($\delta_{TH}^{UE}$).

5. The user grouping method for inter-cell interference coordination technology in mobile telecommunication systems as claimed in claim 4, when the values have the relation as $\overline{G}_0 - \overline{G}_1 < \delta_{TH}^{UE}$, the user equipment (UE) will respond with the average signal strength measured and initiate the inter-cell interference coordination (ICIC) measuring and response system.

6. The user grouping method for inter-cell interference coordination technology in mobile telecommunication systems as claimed in claim 4, when the values have the relation of $\overline{G}_0 - \overline{G}_1 \geq \delta_{TH}^{UE}$, the user equipment (UE) will neither respond with the average signal strength data nor initiate the inter-cell interference coordination (ICIC) measuring and response system, and the serving cell automatically recognizes a user as a cell center user.

7. The user grouping method for inter-cell interference coordination technology in mobile telecommunication systems as claimed in claim 4 whose threshold level $\delta_{TH}^{UE}$ is a positive value.

8. The user grouping method for inter-cell interference coordination technology in mobile telecommunication systems as claimed in claim 1 whose inter-cell interference coordination (ICIC) measuring and response system is to either be a periodic or event-triggered average signal strength response mechanism.

9. The user grouping method for inter-cell interference coordination technology in mobile telecommunication systems as claimed in claim 8 whose event-triggered respond mechanism is to be obtained by defining multiple threshold levels.

10. The user grouping method for inter-cell interference coordination technology in mobile telecommunication systems as claimed in claim 1 whose determination of whether a user is a cell center user or a cell edge user is based on the average signal strength measured and reported by the user equipment (UE) which contains an average signal strength from the serving cell ($\overline{G}_0$), a strongest average signal strength from the neighboring cells ($\overline{G}_1$), and a difference between these two ($\overline{G}_0 - \overline{G}_1$).

11. The user grouping method for inter-cell interference coordination technology in mobile telecommunication systems as claimed in claim 10, when the values have the relation of $\overline{G}_0 - \overline{G}_1 < \delta_{TH}^{SC}$, wherein $\delta_{TH}^{SC}$ is a threshold level, the user is classified as a cell edge user.

12. The user grouping method for inter-cell interference coordination technology in mobile telecommunication systems as claimed in claim 10, when the values have the relation of $\overline{G}_0 - \overline{G}_1 \geq \delta_{TH}^{SC}$, wherein $\delta_{TH}^{SC}$ is a threshold level, the user is classified as a cell center user.

13. The user grouping method for inter-cell interference coordination technology in mobile telecommunication system as claimed in claim 11 whose threshold level $\delta_{TH}^{SC}$ is a positive value and is smaller than or equal to a threshold level of a user side $\delta_{TH}^{UE}$.

14. The user grouping method for inter-cell interference coordination technology in mobile telecommunication systems as claimed in claim 12 whose threshold level $\delta_{TH}^{SC}$ is a positive value and is smaller than or equal to a threshold level of a user side $\delta_{TH}^{UE}$.

15. The user grouping method for inter-cell interference coordination technology in mobile telecommunication systems as claimed in claim 1 whose serving cell classifies a user as a cell center user or a cell edge user according to if an active set size (ASS) of the user is greater than 1.

16. The user grouping method for inter-cell interference coordination technology in mobile telecommunication systems as claimed in claim 15 whose ASS>1 will classify the user as cell edge user; however, the user grouping method for inter-cell interference coordination technology in mobile telecommunication systems as claimed in claim 15 whose ASS=1 will classify the user as cell center user.

17. The user grouping method for inter-cell interference coordination technology in mobile telecommunication systems as claimed in claim 1 whose frequency subchannel allocation steps include:
   a. allocating frequency subchannel from edge subband of the serving cell to cell edge user; and
   b. allocating frequency subchannel from center subband of the serving cell to cell center user.

\* \* \* \* \*